US012032812B1

(12) United States Patent
Chavali et al.

(10) Patent No.: US 12,032,812 B1
(45) Date of Patent: Jul. 9, 2024

(54) SYSTEMS AND METHODS FOR INTENT-BASED AUGMENTED REALITY VIRTUAL ASSISTANT

(71) Applicant: Verizon Patent and Licensing Inc., Basking Ridge, NJ (US)

(72) Inventors: Saikiran N. Chavali, Pune (IN); Abhishek Malhotra, Hyderabad (IN); Aiswarya Devarajan, Chennai (IN); Manu Bhatia, Hyderabad (IN); Lokesh Kosuri, Hyderabad (IN)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 18/341,941

(22) Filed: Jun. 27, 2023

(51) Int. Cl.
*G06F 3/0484* (2022.01)
*G06F 3/16* (2006.01)
*G06T 7/73* (2017.01)
*G06T 19/00* (2011.01)
*G06V 20/20* (2022.01)

(52) U.S. Cl.
CPC ............ *G06F 3/0484* (2013.01); *G06F 3/167* (2013.01); *G06T 7/75* (2017.01); *G06T 19/006* (2013.01); *G06V 20/20* (2022.01); *G06T 2200/24* (2013.01)

(58) Field of Classification Search
CPC ......... G06F 3/0484; G06F 3/167; G06T 7/75; G06T 19/006; G06T 2200/24; G06V 20/20
See application file for complete search history.

(56) References Cited

U.S. PATENT DOCUMENTS

| | | | |
|---|---|---|---|
| 2015/0121216 A1* | 4/2015 | Brown | G06N 3/006 715/705 |
| 2020/0103963 A1* | 4/2020 | Kelly | G10L 15/22 |
| 2023/0342677 A1* | 10/2023 | Desai | G06F 3/012 |

OTHER PUBLICATIONS

J. D'Agostini et al., An Augmented Reality virtual assistant to help mild cognitive impaired users in cooking, Apr. 1, 2018, IEEE Xplore, pp. 12-17 (Year: 2018).*
Andreas Schmeil et al., MARA—A Mobile Augmented Reality-Based Virtual Assistant, Mar. 1, 2007, IEEE Xplore, pp. 267-270 (Year: 2007).*

* cited by examiner

*Primary Examiner* — Tam T Tran (57) ABSTRACT

A system described herein may maintain one or more models that associate respective objects and triggers with sets of actions. The system may receive visual information from a User Equipment ("UE"), may determine that the visual information received from the UE depicts the particular object, and may identify that the one or more triggers are met. The system may provide, to the UE, based on identifying that the visual information received from the UE depicts the particular object, and further based on identifying that the one or more triggers are met, an augmented reality ("AR") virtual assistant that performs the particular set of actions with respect to the particular object.

20 Claims, 10 Drawing Sheets

SYSTEMS AND METHODS FOR INTENT-BASED AUGMENTED REALITY VIRTUAL ASSISTANT

BACKGROUND

Service providers or other entities may provide services or products, such as consumer electronics (e.g., mobile phones, routers, modems, televisions, etc.) or other types of items, that may be used by users. In some situations, users may request technical support when facing issues such as apparent product malfunctions, confusion as to how to operate certain products, or in other situations. Augmented reality ("AR") combines the real world with computer-generated or otherwise artificial elements to enhance a user's perception and interaction with their environment. AR techniques may overlay digital information such as images, videos, three-dimensional models, etc. onto a real-world view (e.g., as captured by a camera of a smartphone, tablet, smart glasses, or other device).

DETAILED DESCRIPTION OF EXAMPLE EMBODIMENTS

The following detailed description refers to the accompanying drawings. The same reference numbers in different drawings may identify the same or similar elements.

Embodiments described herein provide for a virtual assistant, which may be implemented using AR techniques, to assist with actions in an intent-based manner. Some embodiments may utilize artificial intelligence/machine learning ("AI/ML") techniques or other modeling techniques to associate intents with particular actions, such that when an intent is detected, one or more appropriate actions may be performed or indicated to a user. "Intents" may include, for example, detectable triggers or conditions based on which certain actions may be identified. Examples of intents described herein are presented in the context of customer support requests, such as requests to troubleshoot or operate equipment such as computer monitors, routers, etc. Similar concepts may apply to other suitable intents. "Actions," as described herein, may include actions that may be taken by a user to remedy such customer support issues, such as actions relating to troubleshooting or operating equipment. Additionally, in some embodiments, the methods and systems described herein are directed towards generating dynamic training capabilities for learning and development, for troubleshooting scenarios during customer service exchanges, driver fatigue detection in an automobile, in-store theft detection, detecting distractions during extended meetings (e.g., in a video conference), and/or detecting tiredness or distractedness in real-time representatives (e.g., customer care agents) and/or on-field technicians.

Further, in some embodiments, intents and/or actions may be associated with particular objects, equipment, etc. to account for different intents or actions that may be associated with different objects, equipment, etc. For example, a first make or model of a router may have a power switch located on a front side of the router, while a second make or model of a router may have a power switch located on a back side of the router. Thus, while similar intents may be determined with respect to these different routers (e.g., turn on the router, power off the router, restart the router, etc.), the actions may be different (e.g., actuate a power switch on the front of the router or on the back of the router, as appropriate).

Embodiments described herein may further indicate such actions using AR techniques, such as by providing a virtual assistant (e.g., an animated humanoid model or other artificial object) overlaid on a real-time view of a locale in which a user is located. For example, as discussed herein, a user may indicate an intent (e.g., "I want to turn on my monitor"), point a camera at an associated object (e.g., the monitor to be turned on), and a virtual assistant may show the user how to perform an action associated with the intent as well as the particular object (e.g., may point to a power button of the particular make and model of the monitor). In this manner, the user may receive a personalized support experience that is more tailored and specific to the user's needs than might be provided via a telephone call or printed instructions. Further, a provider of the virtual assistant may be able to dedicate reduced human resources to providing repetitive customer support (e.g., via telephone, videoconferencing, or in person) by virtue of the virtual assistant providing such support.

Figure 1A:
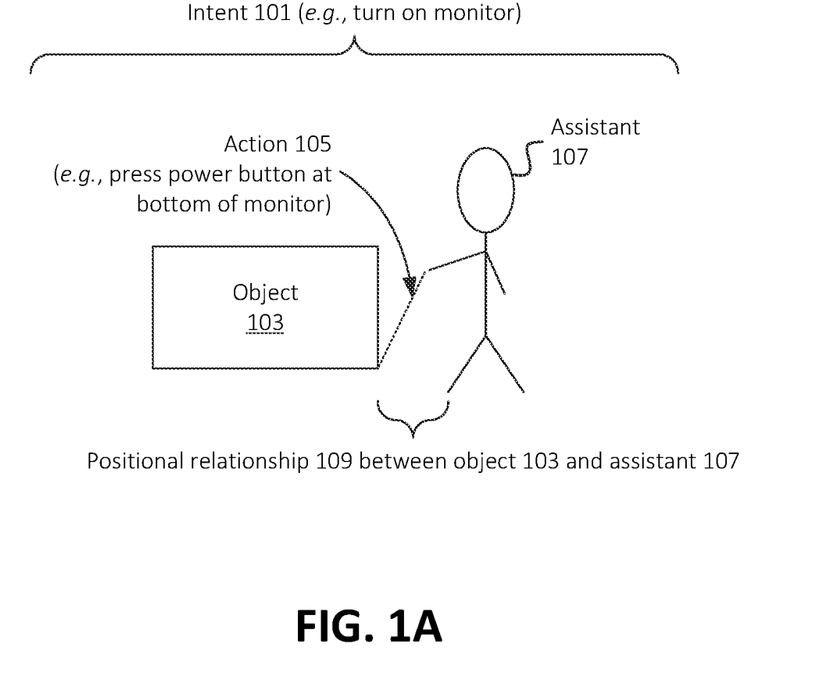
FIG. 1 illustrates an example overview of one or more embodiments described herein.

In accordance with some embodiments, a training operation (e.g., using AI/ML techniques or other suitable modeling techniques) may be used to generate one or more models that associate particular intents, objects, and actions. As shown in FIG. 1A, for example, a first intent 101 may be associated with a first object 103 (e.g., a computer monitor, such as a computer monitor of a particular make, model, type, etc.) and a first set of actions 105. In this example, intent 101 may be an intent associated with turning on the particular monitor, such as by pressing a power button located on a housing of the monitor (e.g., at the bottom of object 103). Actions 105 may be performed by a particular individual, referred to as assistant 107. Actions 105 may be performed during a training operation, in which the particular intent 101 is indicated as being associated with actions 105 and object 103. In some embodiments, actions 105 may be captured by a camera or other suitable device. In some embodiments, image or video recognition techniques (e.g., computer vision) may be used to identify actions 105, including identifying motions or movements at particular key points of assistant 107 (e.g., hands, feet, elbows, head, etc.). Additionally, or alternatively, some other sort of motion capture technique may be utilized to identify actions 105 as performed by assistant 107.

In some embodiments, actions 105 may include or may be associated with a positional relationship 109 between assistant 107 and object 103. For example, positional relationship 109 may indicate where assistant 107 is located in relation to object 103 when some or all of actions 105 are performed. Positional relationship 109 may utilize one or more portions of object 103 or assistant 107 as reference points, such as a bottom corner or edge of object 103, one or both feet of assistant 107, one or both hands of assistant 107, etc. In this manner, actions 105 may be directly related to object 103, such that when support using a virtual assistant is provided (e.g., using the same intent 101), the virtual assistant may be able to be properly positioned in relation to an object in question for which the support is being requested (e.g., such that actions 105 as performed by the virtual assistant are performed on the object in question rather than at some arbitrary location).

Figure 1B:
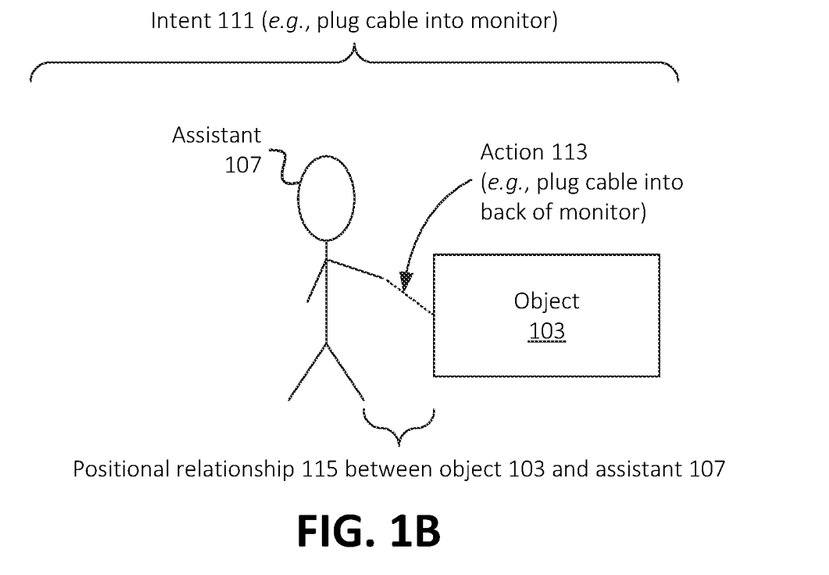

FIG. 1B illustrates another example intent 111 along with associated actions 113, object 103, and positional relationship 115 between assistant 107 and object 103. In this example, intent 111 is associated with the same object 103 as intent 101, but actions 113 associated with intent 111 may be different from actions 105 associated with intent 101. As shown, for example, intent 111 may be an intent associated with plugging a cable into a monitor represented by object 103 (e.g., a particular make, model, type, etc. of monitor). Actions 113 and positional relationship 115 may indicate that the cable should be plugged into the back of the monitor.

Figure 2:
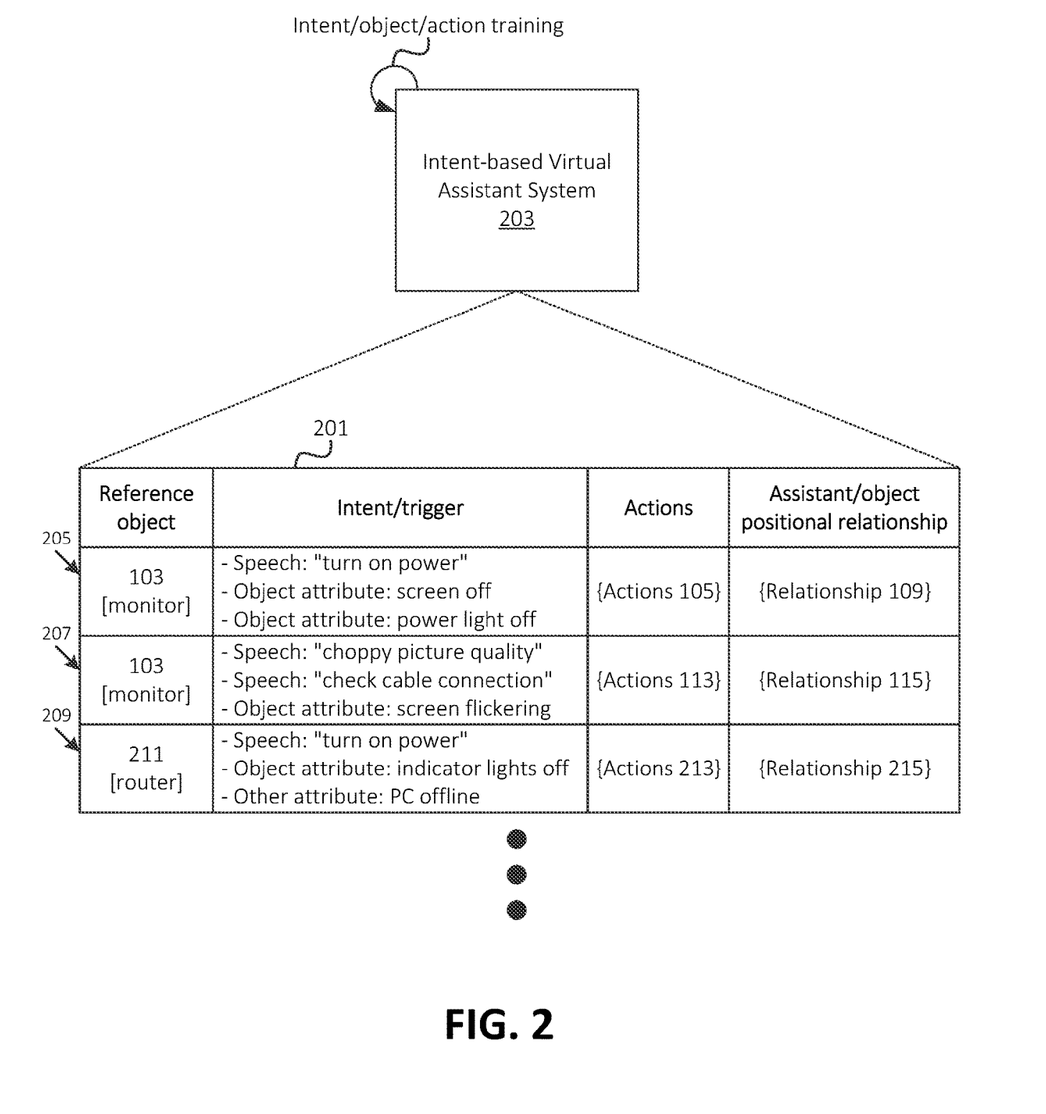
FIG. 2 illustrates an example data structure representing one or more intent models, in accordance with some embodiments.

FIG. 2 illustrates an example data structure 201 that may be maintained by Intent-based Virtual Assistant System ("IVAS") 203 of some embodiments. Data structure 201 may be generated as the result of one or more training operations, in which one or more models are trained, generated, etc. based on particular intents as well as objects and/or actions associated with such intents. Reference objects and intents may be manually provided or indicated (e.g., by an administrator, operator, assistant 107, etc. associated with IVAS 203) and/or may be automatically detected (e.g., using AI/ML techniques or other suitable techniques). Similarly, particular actions, positional relationships, etc. may be manually indicated and/or may be automatically detected using AI/ML techniques, image or video recognition techniques, or the like. In this manner, one or more models maintained by IVAS 203 may be trained, generated, refined, etc. in order to associate particular triggering conditions, objects, actions, positional relationships, etc. with particular intents that can be identified (e.g., during "runtime" of utilizing such models).

Each row of data structure 201 may refer to a particular intent associated with a particular object. For example, row 205 may refer to intent 101 (e.g., associated with object 103, such as a particular make, model, type, size, etc. of computer monitor), row 207 may refer to intent 111 (e.g., associated with the same object 103), row 209 may refer to another intent associated with a different object 211 (e.g., a router), and so on. As noted above, different intents (e.g., rows, entries, etc. of data structure 201) may be associated with different objects. For example, while rows 205 and 207 refer to respective intents 101 and 111 associated with a particular make, model, type, etc. of computer monitor, different intents may be associated with similar triggers (e.g., a user's request to assist with turning on a monitor or checking the connection of a cable to the monitor), but with different actions due to variations in configurations or attributes of different monitors (e.g., buttons or ports may be located at different parts of different monitors).

The entries of data structure 201 may thus indicate particular objects associated with different intents, triggers or conditions based on which a given intent may be identified, actions to perform when the intent is identified, a positional relationship between a virtual assistant and the object, and/or other suitable information. For example, row 205 may indicate that if one or more triggers or conditions are met, such as a user speaking or entering text (e.g., via a keypad or other textual input) matching "turn on power," then the intent associated with row 205 may be identified. The user's speech or text entry may be determined as "matching" the triggering phrase in row 205 if such speech or text entry is an exact match, and/or if such speech or text entry is determined to be at least a threshold level of similarity of the triggering phrase included in row 205. For example, natural language processing ("NLP") techniques or other suitable techniques may be used to identify that words or phrases of speech or text entry provided by the user are at least a threshold measure of similarity to the triggering phrase included in row 205. For example, if the user states "I want to turn on this monitor," such speech utterance may be identified as meeting the triggering phrase "turn on power" included in row 205 of data structure 201.

The triggering conditions of row 205 may, in some embodiments, include one or more other conditions, such as attributes of the reference object (i.e., object 103, such as a monitor, in this example). Such attributes may include detectable attributes of the object, which may be detected via image or video recognition techniques (e.g., computer vision techniques), such as an indication that a screen of the monitor is off, and/or that a power indicator light of the monitor is off. The triggers associated with the attributes may incorporate or may be based on one or more additional models, such as models the associate particular visual attributes with particular classifications, identifiers, etc. For example, one such model may associate a black screen (e.g., as detected by a camera) displayed by the monitor as being associated with a "screen off" classification.

In some embodiments, the intent may be determined based on one of the triggering conditions being met, and/or may be determined based on multiple triggering conditions being met. For example, data structure 201 may include information indicating that the intent associated with row 205 should be identified only when two or more of the triggering conditions are met. In other examples, structure 201 may include information indicating that the intent associated with row 205 should be identified when any of the triggering conditions are met.

Row 205 may further include information indicating actions 105 to perform when the particular intent is identified (e.g., when some or all of the triggering conditions are identified). Actions 105 may be denoted by a series of movements, positions, etc. of one or more "hooks," rigging points, reference points, etc., such that a virtual assistant would be able to be generated and/or controlled in order to reproduce the series of actions 105. Row 205 may further include positional relationship 109 between such virtual assistant and object 103. As discussed above, the positional relationship 109 indicate an orientation, position, etc. of the virtual assistant with respect to object 103, such that the virtual assistant is able to demonstrate actions to perform on real-world objects by being superimposed or otherwise positioned in a user interface based on such positional relationship information.

In some embodiments, the triggering information may include attributes or triggers in addition to, or in lieu of, attributes of the reference object itself. For example, row 209 may be associated with object 211, such as a router which provides connectivity to one or more other devices (e.g., a personal computer ("PC"), tablet devices, Internet of Things ("IoT") devices, etc.). In some embodiments, the triggering information for an intent to turn on the power of the router may include a condition that a PC is offline, unreachable, etc. For example, the router may be associated with the PC, inasmuch as the same user, account, etc. associated with the router may also be associated with the PC, and/or the PC may have previously received network connectivity via the router. If the PC is unreachable via a network, this may indicate that the router is powered off, and may therefore be a triggering condition for identifying the intent to power the router on. As similarly discussed above, row 209 may include a set of actions 213 and/or positional relationship 215 between a virtual assistant and the router, where such actions 213 and/or positional relationship 215 may be used to indicate (e.g., using AR techniques) how to power the router on, such as by pushing a button on the router or performing other suitable actions.

Figure 3:
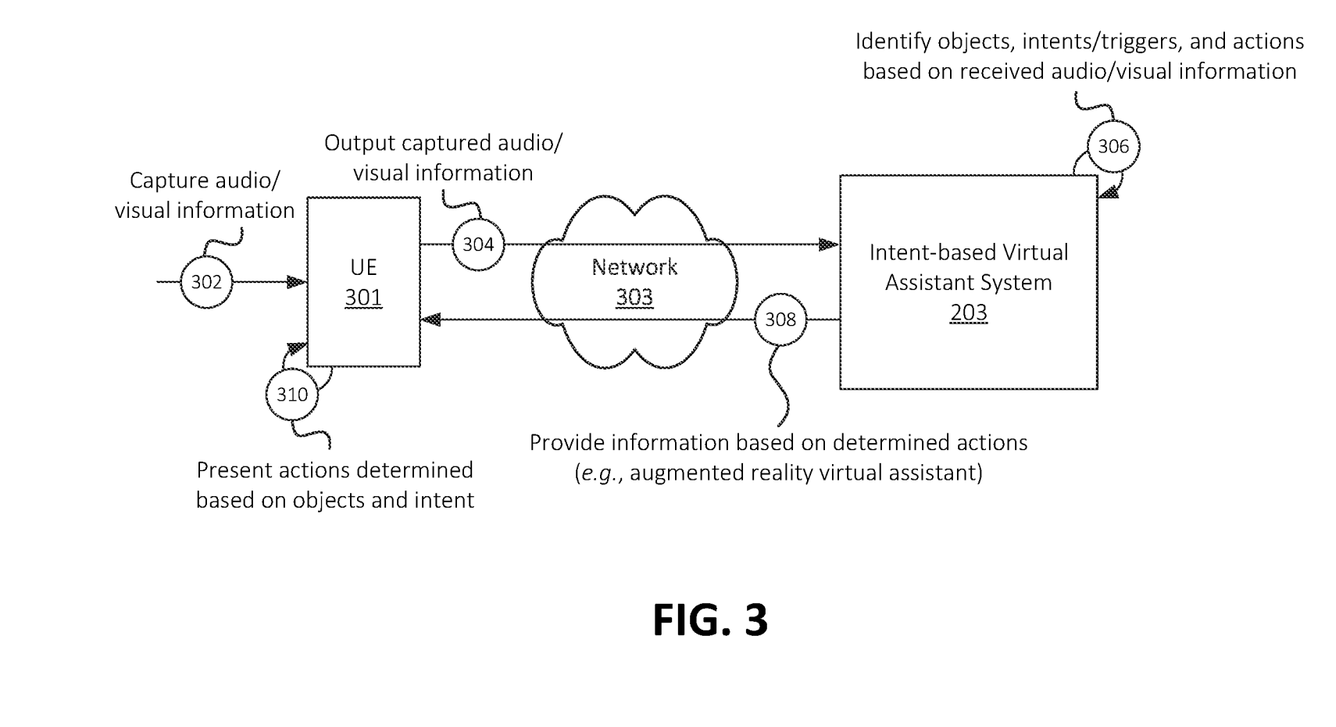
FIGS. 3 and 4 illustrate examples of providing an intent-based virtual assistant, in accordance with some embodiments.

FIG. 3 illustrates an example of utilizing one or more models (e.g., as represented by data structure 201) in order to provide an intent-based virtual assistant in an AR implementation. As shown, a particular user equipment ("UE") 301, which may include or may be communicatively coupled to a smart phone, smart glasses or other wearable device, a tablet device, etc. UE 301 may be connected to network 303, which may include one or more wireless networks (e.g., a Long-Term Evolution ("LTE") network, a Fifth Generation ("5G") network, a WiFi network, etc.), the Internet, and/or one or more other networks. As shown, UE 301 may capture (at 302) audio and/or visual information, such as via one or more cameras, microphones, or other suitable sensors, devices, or components that are integrated in or are communicatively coupled to UE 301. An application executing at 301, such as an AR application, a technical support application, etc. may receive some or all of the captured audio and/or visual information. In some embodiments, a user of UE 301 may select an option in such application to provide consent for the application to receive the captured audio and/or visual information. In some situations, the user may point a camera of UE 301 at a particular object for which support is requested or desired, such that the captured information depicts the particular object. In some situations, the captured visual information may depict a portion of the object, or may not depict the object at all. In some situations, the captured audio information may include a speech utterance of the user, such as a query or request for assistance. In some situations, the captured audio information may include beeps, alert sounds, etc. emanating from an object for which support is requested or desired.

UE 301 may output (at 304) some or all of the captured audio and/or visual information to IVAS 203. For example, UE 301 and/or an application executing thereon may receive or maintain communication information associated with IVAS 203, such as an Internet Protocol ("IP") address, a Uniform Resource Locator ("URL"), etc. via which UE 301 may communicate (e.g., via network 303) with IVAS 203. IVAS 203 may identify (at 306) one or more objects, triggers, intents, etc. based on the received audio and/or visual information. For example, IVAS 203 may perform image or video recognition techniques to identify particular objects or triggers (e.g., based on object attributes or other visual attributes, as discussed above) depicted in received visual information. Additionally, or alternatively, IVAS 203 may perform speech or other audio recognition to identify particular objects or triggers (e.g., based on object attributes or other audible attributes) depicted in received audio information. In some embodiments, IVAS 203 may identify other information based on which triggers or objects may be identified, such as text input from UE 301 or some other source, attributes of one or more other devices or systems (e.g., whether a particular device, which is associated with a particular reference object, is reachable is network 303, as discussed above), and/or other suitable information. As discussed above, IVAS 203 may identify a particular intent based on one or more objects and/or triggers identified based on the received audio and/or visual information, and/or based on other suitable information.

In some embodiments, IVAS 203 may identify one or more actions depicted in received visual information that partially match a set of actions associated with one or more models. For example, IVAS 203 may identify that a user as depicted in visual information has performed an initial portion of a particular set of actions (e.g., has placed his or her arm proximate to a power button of a monitor, but has not pressed the power button), and may identify an intent associated with the partial performance of the set of actions associated with the intent (e.g., powering on a monitor, in this example).

As discussed above, identifying (at 306) actions to perform may include identifying actions that were trained as being associated with the identified intent. For example, such actions may include positions or movements associated with particular reference points, such as hands, shoulders, feet, etc. Such actions may be determined with regard to a positional relationship with the reference object, as discussed above. IVAS 203 may provide (at 308) information based on the determined actions to UE 301. Such information may include, for example, information that may be used by UE 301 to present (at 310) a virtual assistant performing such actions with regard to the reference object. For example, as discussed above, the virtual assistant may be implemented using AR techniques, in which the virtual assistant is positioned proximate to the reference object (e.g., based on the positional relationship information) and performs one or more actions with regard to the reference object, such as by simulating the pressing of a button, the insertion of a cable, or other actions associated with respective intents.

As noted above, and as shown in FIG. 4, IVAS 203 may identify intents based on partial performance of a set of actions associated with such intents, and may provide feedback based on identifying the partial performance of such sets of actions. The feedback may serve to correct actions that have been performed or to provide guidance on how to complete a set of actions associated with a given intent. For example, UE 301 may output (at 404) audio and/or visual information (captured at 402) to IVAS 203, which may utilize image and/or video recognition techniques to identify (at 406) that a subset of a given set of actions, associated with a respective intent, have been performed (e.g., as depicted in the captured audio and/or visual information). IVAS 203 may identify subsequent actions, of the set of actions, that have not yet been performed, and may provide (at 408) feedback indicating the subsequent actions. As similarly discussed above, such feedback may include providing a virtual assistant using AR techniques, where such virtual assistant may perform some or all of the subsequent actions with regard to the reference object. UE 301 may present (at 410) the feedback, such as by displaying the virtual assistant in an overlay over captured real-time visual information, in which the virtual assistant performs the subsequent actions.

Figure 4:
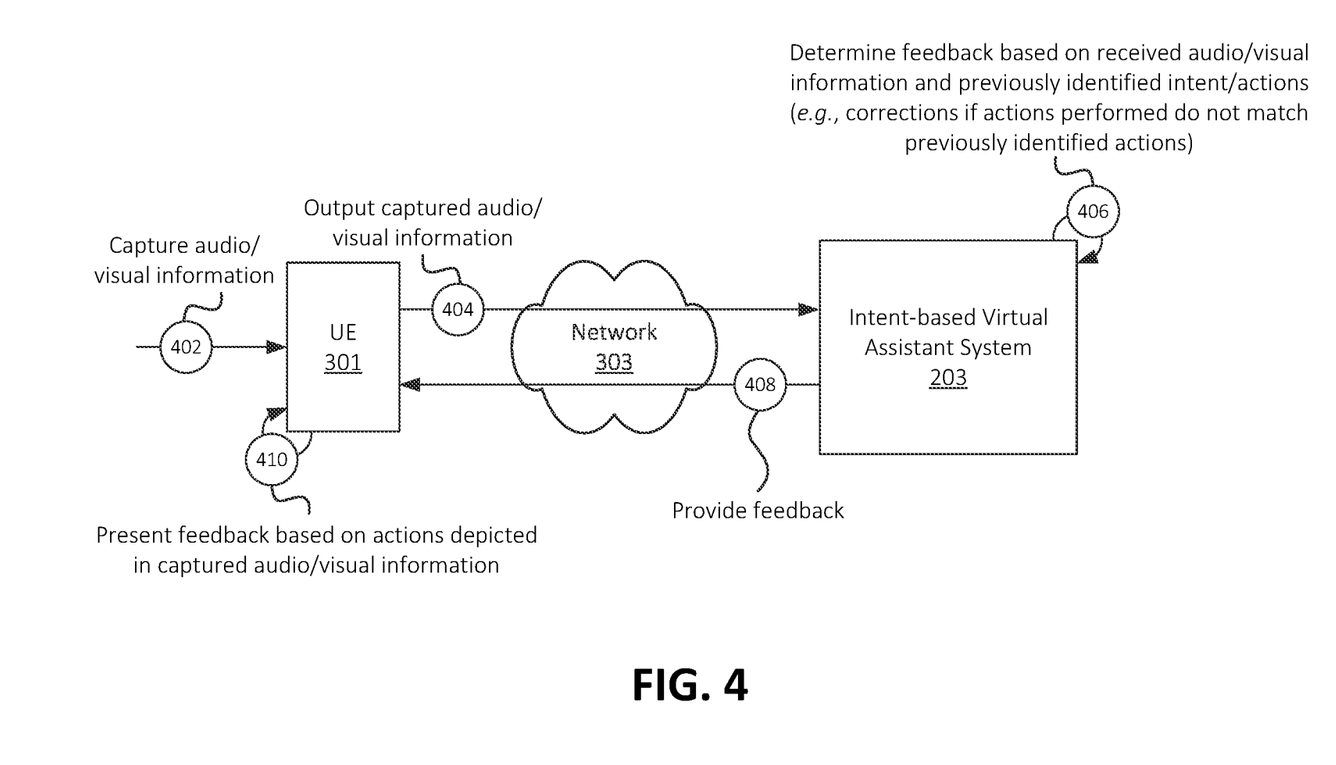

In some embodiments, the presentation of information (e.g., at 310 or 410) by UE 301 and/or the providing of captured audio and/or visual information (at 302 or 402) by UE 301 may be performed in an ongoing manner. For example, IVAS 203 may receive captured visual information from UE 301 in real time or near-real time, and may generate the virtual assistant (e.g., a visual representation of the virtual assistant using AR techniques, overlaid or superimposed in a real-world environment depicted by the received visual information) in real time or near-real time. IVAS 203 may accordingly provide the virtual assistant to UE 301 in an ongoing and dynamic manner, such that UE 301 is able to present the virtual assistant in accordance with AR techniques.

Figure 5A:
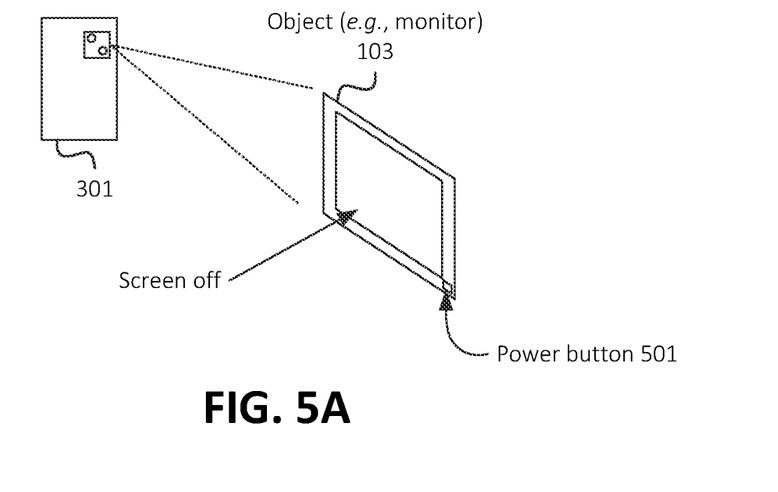
FIGS. 5A and 5B illustrate examples of providing an intent-based virtual assistant, in accordance with some embodiments.
Figure 5B:
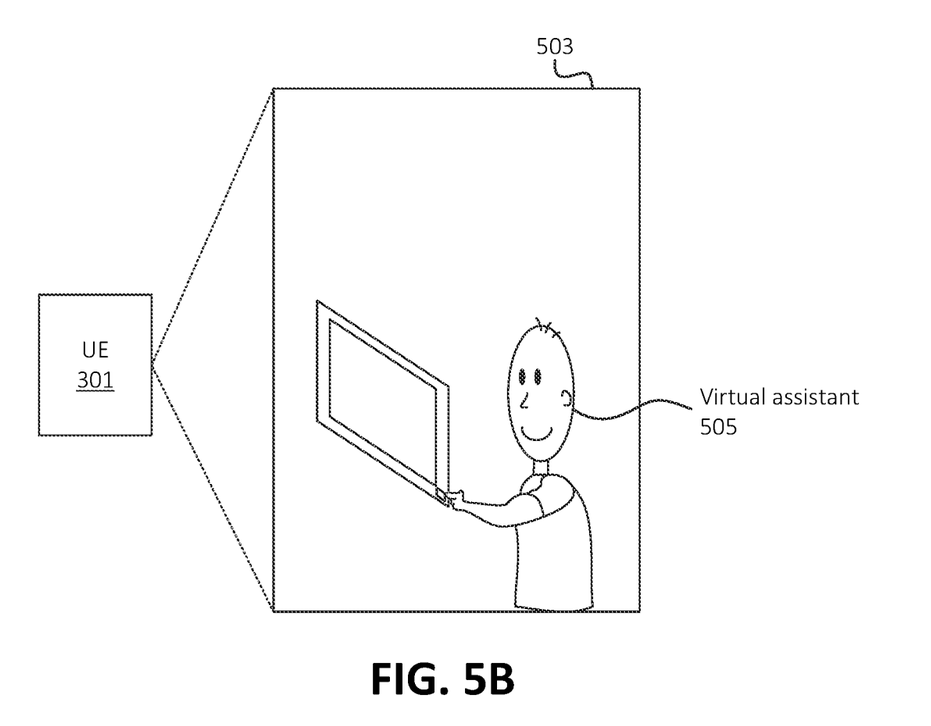

FIGS. 5A and 5B illustrate an example scenario in which AR techniques may be used to provide an intent-based virtual assistant, in accordance with some embodiments. As shown in FIG. 5A, UE 301 may capture visual information (e.g., using a camera) depicting a particular object 103, such as a monitor. As shown, the screen of the monitor may be off. Additionally, a power button 501 of the monitor may be located at the bottom right corner of the monitor. As discussed above, UE 301 may provide the visual information, depicting the particular monitor, to IVAS 203. IVAS 203 may identify the particular monitor (e.g., the particular make, model, type, etc.) by identifying detectable attributes of the monitor. In some embodiments, IVAS 203 may further identify an intent associated with the monitor and its respective attributes, such as the screen being off (e.g., an intent associated with turning on the monitor). Additionally, or alternatively, IVAS 203 may identify the intent based on other information, such as a user of UE 301 typing or speaking a request for information on how to turn on the monitor.

FIG. 5B illustrates an example user interface ("UI") 503 in which intent-based virtual assistant 505 (e.g., as generated or provided by IVAS 203) may be presented in accordance with AR techniques. As discussed above, a position of and/or actions performed by virtual assistant 505 may be determined based on the particular reference object with which the intent is based (e.g., the particular monitor, in this example) and one or more triggers (e.g., the screen of the monitor being off, a request from a user of UE 301, etc.). In this example, virtual assistant 505 may be positioned within UI 503 such that virtual assistant 505 appears to be (e.g., is superimposed, overlaid, etc. within a real-world environment) performing actions associated with the determined intent, including pressing power button 501 in order to turn on the monitor.

Figure 6:
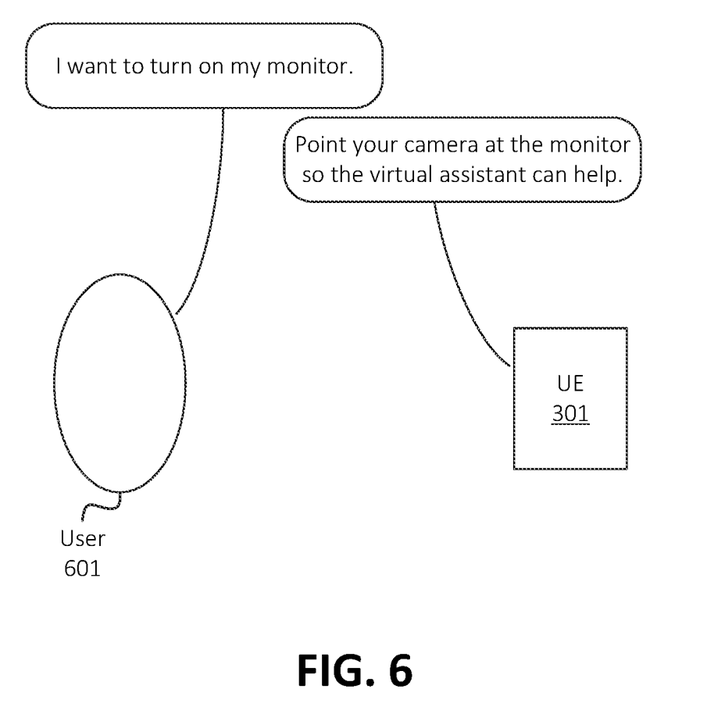
FIG. 6 illustrates an example of determining an intent for which a virtual assistant should be provided, in accordance with some embodiments.

FIG. 6 illustrates another example of how an intent may be determined based on a particular object and one or more triggers. In this example, a user 601 of UE 301 may indicate (e.g., by speech, text input, etc.) a potential intent that would be associated with a reference object, but the object may not be provided or indicated when user 601 indicates the potential intent. In this example, user 601 may verbally say "I want to turn on my monitor." IVAS 203 may identify, such as by using NLP techniques, that the utterance by the user partially matches a particular intent, inasmuch as one or more triggers associated with one or more intents are met, but a reference object is not indicated. In this situation, IVAS 203 may prompt user 601 to provide information based on which the reference object can be determined, and so that the proper intent along with its associated actions may be determined. For example, IVAS 203 may communicate with UE 301 to cause UE 301 to request further information, such as by an audible prompt, a visual pop-up prompt, etc. In this example, UE 301 may audibly request that user 601 point a camera of UE 301 at the indicated monitor, such that the particular make, model, type, etc. of the monitor may be determined. In this manner, IVAS 203 may not only provide requested support from users, but may further guide users into making more specific requests in order to obtain more personalized assistance from the intent-based virtual assistant of some embodiments.

Figure 7:
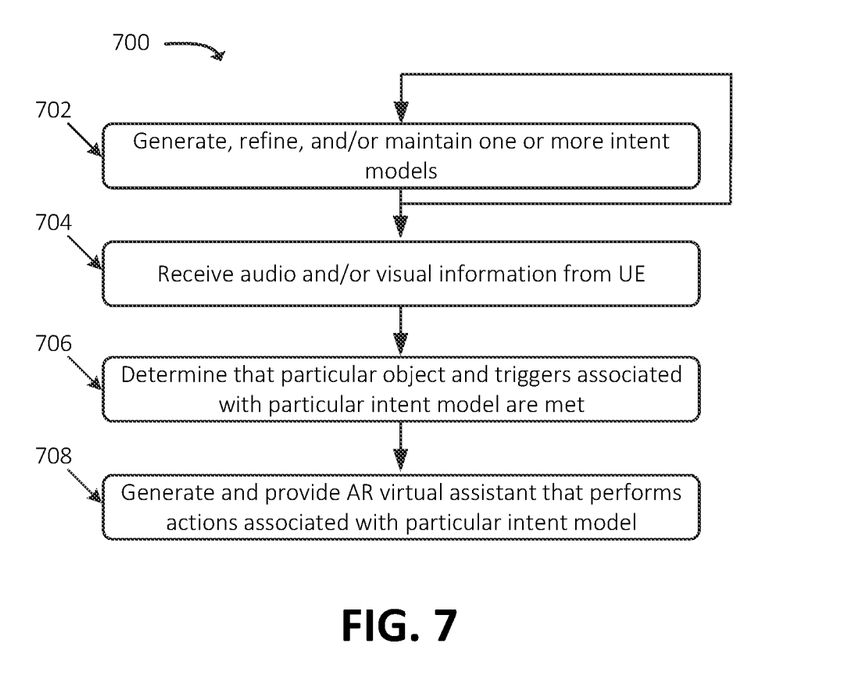
FIG. 7 illustrates an example process for providing an intent-based virtual assistant, in accordance with some embodiments.

FIG. 7 illustrates an example process 700 for providing an intent-based virtual assistant, in accordance with some embodiments. In some embodiments, some or all of process 700 may be performed by IVAS 203. In some embodiments, one or more other devices may perform some or all of process 700 in concert with, and/or in lieu of, IVAS 203.

As shown, process 700 may include generating, refining, maintaining, etc. (at 702) one or more intent models. For example, as discussed above, a training operation may be performed in which actions are identified with respect to particular triggers and objects, such that different objects may be associated with different triggers and actions. For example, one type of monitor may be associated with one set of actions in order to power the monitor on, while another type of monitor (e.g., having a power button in a different place) may be associated with a different set of actions to power the monitor on. As such, a particular intent model may associate a particular object and set of triggers with a particular set of actions. The intent models may be refined, trained, etc. over time (e.g., using AI/ML techniques or other suitable modeling techniques). As discussed above, the intent models may also include positional relationship information, indicating where a virtual assistant should be located relative to a given reference object, when performing the actions.

Process 700 may further include receiving (at 704) audio and/or visual information from a particular UE 301. For example, as discussed above, an application of UE 301 (e.g., an AR-enabled customer support application) may capture and provide audio and/or visual information to IVAS 203, such as in real time or near-real time. The audio and/or visual information may depict, for example, a particular object, a request for support with respect to the particular object, etc.

Process 700 may additionally include determining (at 706) the particular object as well as determining that one or more triggers associated with a given intent model are met. For example, IVAS 203 may identify that the captured visual information depicts the particular object, and may identify that attributes of the objects, one or more other attributes, spoken utterances of the user or other user input, etc. meet the triggers associated with the particular intent model.

Process 700 may also include generating and providing (at 708) an AR virtual assistant that performs the actions associated with the identified intent model. For example, as discussed above, IVAS 203 may communicate with UE 301 (e.g., on an ongoing, real time, or near-real time basis) to provide the AR virtual assistant, such that the AR virtual assistant is positioned within a UI of UE 301 proximate to (e.g., based on the positional relationship data associated with the intent model) the reference object. Further, as discussed above, the AR virtual assistant may perform the one or more actions associated with the intent model, thus providing the user of UE 301 with support for the reference object without necessitating the user to contact a call center or pursue other support-related avenues.

Figure 8:
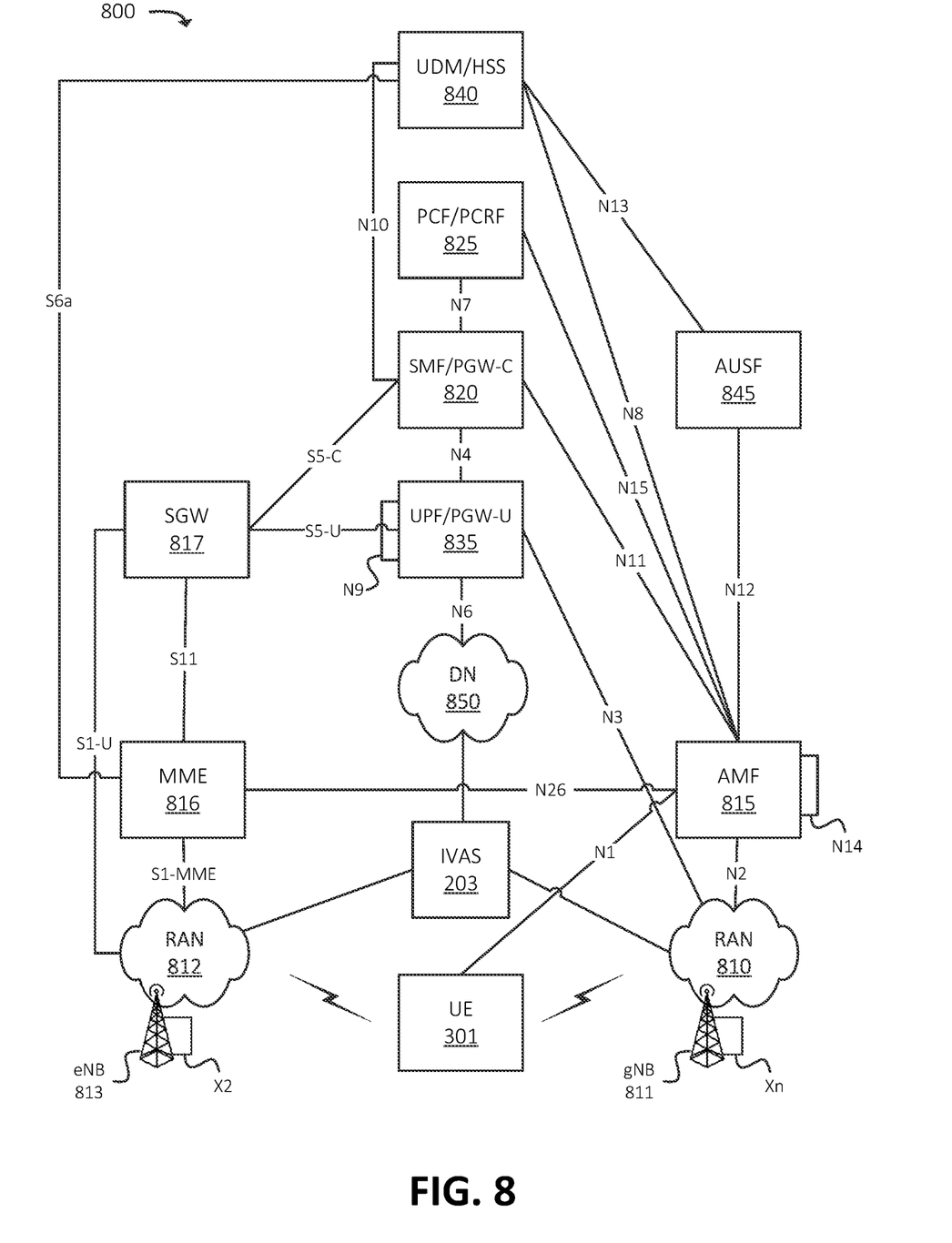
FIG. 8 illustrates an example environment in which one or more embodiments, described herein, may be implemented.

FIG. 8 illustrates an example environment 800, in which one or more embodiments may be implemented. In some embodiments, environment 800 may correspond to a 5G network, and/or may include elements of a 5G network. In some embodiments, environment 800 may correspond to a 5G Non-Standalone ("NSA") architecture, in which a 5G radio access technology ("RAT") may be used in conjunction with one or more other RATs (e.g., an LTE RAT), and/or in which elements of a 5G core network may be implemented by, may be communicatively coupled with, and/or may include elements of another type of core network (e.g., an evolved packet core ("EPC")). In some embodiments, portions of environment 800 may represent or may include a 5G core ("5GC"). As shown, environment 800 may include UE 801, RAN 810 (which may include one or more Next Generation Node Bs ("gNBs") 811), RAN 812 (which may include one or more evolved Node B s ("eNBs") 813), and various network functions such as Access and Mobility Management Function ("AMF") 815, Mobility Management Entity ("MME") 816, Serving Gateway ("SGW") 817, Session Management Function ("SMF")/Packet Data Network ("PDN") Gateway ("PGW")-Control plane function ("PGW-C") 820, Policy Control Function ("PCF")/Policy Charging and Rules Function ("PCRF") 825, Application Function ("AF") 830, User Plane Function ("UPF")/PGW-User plane function ("PGW-U") 835, Unified Data Management ("UDM")/Home Subscriber Server ("HSS") 840, and Authentication Server Function ("AUSF") 845. Environment 800 may also include one or more networks, such as Data Network ("DN") 850. Environment 800 may include one or more additional devices or systems communicatively coupled to one or more networks (e.g., DN 850), such as IVAS 203.

The example shown in FIG. 8 illustrates one instance of each network component or function (e.g., one instance of SMF/PGW-C 820, PCF/PCRF 825, UPF/PGW-U 835, UDM/HSS 840, and/or AUSF 845). In practice, environment 800 may include multiple instances of such components or functions. For example, in some embodiments, environment 800 may include multiple "slices" of a core network, where each slice includes a discrete and/or logical set of network functions (e.g., one slice may include a first instance of AMF 815, SMF/PGW-C 820, PCF/PCRF 825, and/or UPF/PGW-U 835, while another slice may include a second instance of AMF 815, SMF/PGW-C 820, PCF/PCRF 825, and/or UPF/PGW-U 835). The different slices may provide differentiated levels of service, such as service in accordance with different Quality of Service ("QoS") parameters.

The quantity of devices and/or networks, illustrated in FIG. 8, is provided for explanatory purposes only. In practice, environment 800 may include additional devices and/or networks, fewer devices and/or networks, different devices and/or networks, or differently arranged devices and/or networks than illustrated in FIG. 8. For example, while not shown, environment 800 may include devices that facilitate or enable communication between various components shown in environment 800, such as routers, modems, gateways, switches, hubs, etc. In some implementations, one or more devices of environment 800 may be physically integrated in, and/or may be physically attached to, one or more other devices of environment 800. Alternatively, or additionally, one or more of the devices of environment 800 may perform one or more network functions described as being performed by another one or more of the devices of environment 800.

Elements of environment 800 may interconnect with each other and/or other devices via wired connections, wireless connections, or a combination of wired and wireless connections. Examples of interfaces or communication pathways between the elements of environment 800, as shown in FIG. 8, may include an N1 interface, an N2 interface, an N3 interface, an N4 interface, an N5 interface, an N6 interface, an N7 interface, an N8 interface, an N9 interface, an N10 interface, an N11 interface, an N12 interface, an N13 interface, an N14 interface, an N15 interface, an N26 interface, an S1-C interface, an S1-U interface, an S5-C interface, an S5-U interface, an S6a interface, an 511 interface, and/or one or more other interfaces. Such interfaces may include interfaces not explicitly shown in FIG. 8, such as Service-Based Interfaces ("SBIs"), including an Namf interface, an Nudm interface, an Npcf interface, an Nupf interface, an Nnef interface, an Nsmf interface, and/or one or more other SBIs. In some embodiments, environment 800 may be, may include, may be implemented by, and/or may be communicatively coupled to network 303.

UE 801 may include a computation and communication device, such as a wireless mobile communication device that is capable of communicating with RAN 810, RAN 812, and/or DN 850. UE 801 may be, or may include, a radiotelephone, a personal communications system ("PCS") terminal (e.g., a device that combines a cellular radiotelephone with data processing and data communications capabilities), a personal digital assistant ("PDA") (e.g., a device that may include a radiotelephone, a pager, Internet/intranet access, etc.), a smart phone, a laptop computer, a tablet computer, a camera, a personal gaming system, an IoT device (e.g., a sensor, a smart home appliance, a wearable device, a Machine-to-Machine ("M2M") device, or the like), a Fixed Wireless Access ("FWA") device, or another type of mobile computation and communication device. UE 801 may send traffic to and/or receive traffic (e.g., user plane traffic) from DN 850 via RAN 810, RAN 812, and/or UPF/PGW-U 835.

RAN 810 may be, or may include, a 5G RAN that includes one or more base stations (e.g., one or more gNB s 811), via which UE 801 may communicate with one or more other elements of environment 800. UE 801 may communicate with RAN 810 via an air interface (e.g., as provided by gNB 811). For instance, RAN 810 may receive traffic (e.g., user plane traffic such as voice call traffic, data traffic, messaging traffic, etc.) from UE 801 via the air interface, and may communicate the traffic to UPF/PGW-U 835 and/or one or more other devices or networks. Further, RAN 810 may receive signaling traffic, control plane traffic, etc. from UE 801 via the air interface, and may communicate such signaling traffic, control plane traffic, etc. to AMF 815 and/or one or more other devices or networks. Additionally, RAN 810 may receive traffic intended for UE 801 (e.g., from UPF/PGW-U 835, AMF 815, and/or one or more other devices or networks) and may communicate the traffic to UE 801 via the air interface.

RAN 812 may be, or may include, a LTE RAN that includes one or more base stations (e.g., one or more eNBs 813), via which UE 801 may communicate with one or more other elements of environment 800. UE 801 may communicate with RAN 812 via an air interface (e.g., as provided by eNB 813). For instance, RAN 812 may receive traffic (e.g., user plane traffic such as voice call traffic, data traffic, messaging traffic, signaling traffic, etc.) from UE 801 via the air interface, and may communicate the traffic to UPF/PGW-U 835 (e.g., via SGW 817) and/or one or more other devices or networks. Further, RAN 812 may receive signaling traffic, control plane traffic, etc. from UE 801 via the air interface, and may communicate such signaling traffic, control plane traffic, etc. to MME 816 and/or one or more other devices or networks. Additionally, RAN 812 may receive traffic intended for UE 801 (e.g., from UPF/PGW-U 835, MME 816, SGW 817, and/or one or more other devices or networks) and may communicate the traffic to UE 801 via the air interface.

AMF 815 and/or MME 816 may include one or more devices, systems, Virtualized Network Functions ("VNFs"), Cloud-Native Network Functions ("CNFs"), etc., that perform operations to register UE 801 with the network, to establish bearer channels associated with a session with UE 801, and/or other suitable registration and/or mobility-related operations.

SGW 817 may include one or more devices, systems, VNFs, CNFs, etc., that aggregate traffic received from one or more eNBs 813 and send the aggregated traffic to an external network or device via UPF/PGW-U 835. SMF/PGW-C 820 may include one or more devices, systems, VNFs, CNFs, etc., that gather, process, store, and/or provide information in a manner described herein. SMF/PGW-C 820 may, for example, facilitate the establishment of communication sessions on behalf of UE 801. In some embodiments, the establishment of communications sessions may be performed in accordance with one or more policies provided by PCF/PCRF 825.

UPF/PGW-U 835 may include one or more devices, systems, VNFs, CNFs, etc., that receive, store, and/or provide data (e.g., user plane data). For example, UPF/PGW-U 835 may receive user plane data (e.g., voice call traffic, data traffic, etc.), destined for UE 801, from DN 850, and may forward the user plane data toward UE 801 (e.g., via RAN 810, SMF/PGW-C 820, and/or one or more other devices). Similarly, UPF/PGW-U 835 may receive traffic from UE 801 (e.g., via RAN 810, RAN 812, SMF/PGW-C 820, and/or one or more other devices), and may forward the traffic toward DN 850.

UDM/HSS 840 and AUSF 845 may include one or more devices, systems, VNFs, CNFs, etc., that manage, update, and/or store, in one or more memory devices associated with AUSF 845 and/or UDM/HSS 840, profile information associated with a subscriber. AUSF 845 and/or UDM/HSS 840 may perform authentication, authorization, and/or accounting operations associated with the subscriber and/or a communication session with UE 801.

DN 850 may include one or more wired and/or wireless networks. For example, DN 850 may include an IP-based PDN, a wide area network ("WAN") such as the Internet, a private enterprise network, and/or one or more other networks. UE 801 may communicate, through DN 850, with data servers, other UEs 801, and/or to other servers or applications that are coupled to DN 850. DN 850 may be connected to one or more other networks, such as a public switched telephone network ("PSTN"), a public land mobile network ("PLMN"), and/or another network. DN 850 may be connected to one or more devices, such as content providers, applications, web servers, and/or other devices, with which UE 801 may communicate.

Figure 9:
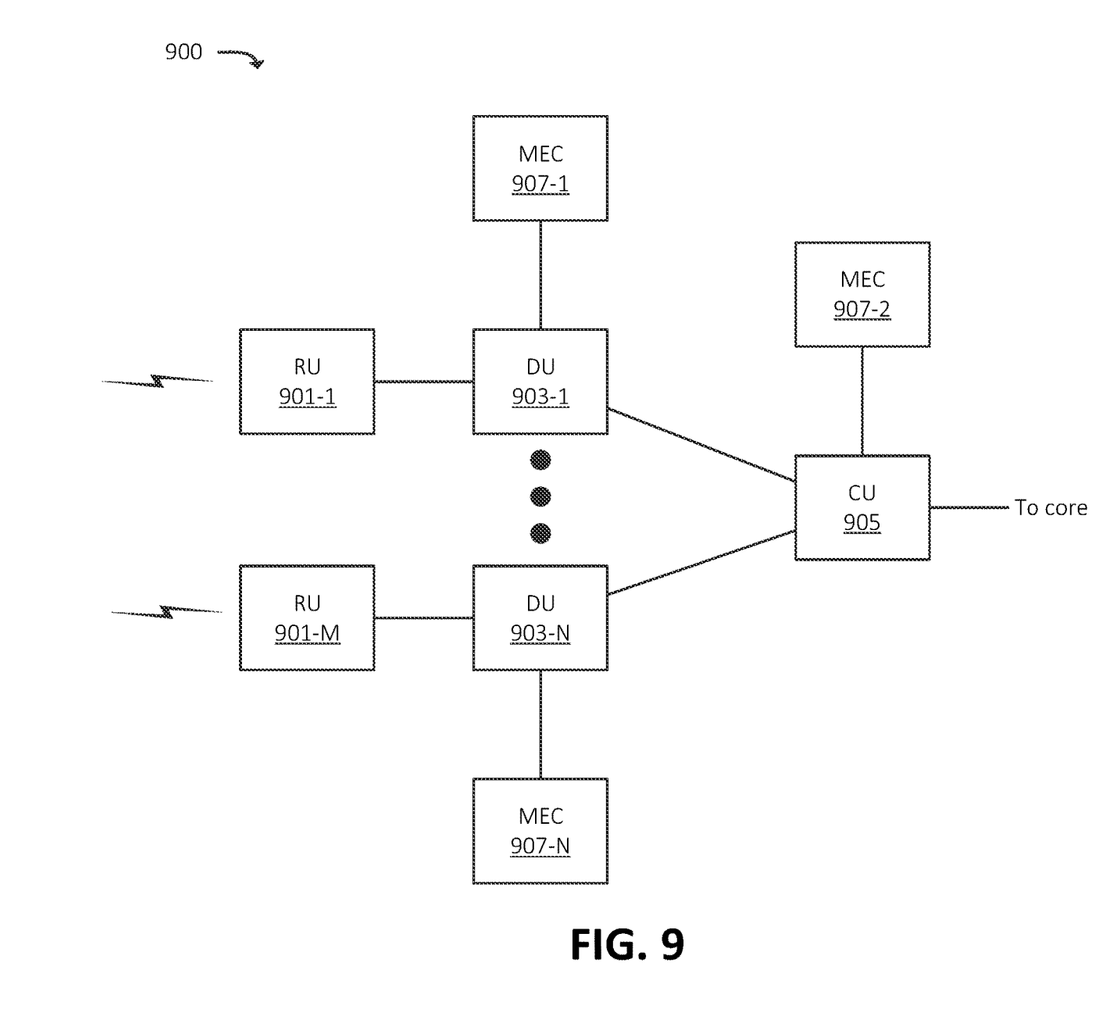
FIG. 9 illustrates an example arrangement of a radio access network ("RAN"), in accordance with some embodiments.

FIG. 9 illustrates an example RAN environment 900, which may be included in and/or implemented by one or more RANs (e.g., RAN 810 or some other RAN). In some embodiments, a particular RAN 810 may include one RAN environment 900. In some embodiments, a particular RAN 810 may include multiple RAN environments 900. In some embodiments, RAN environment 900 may correspond to a particular gNB 811 of RAN 810. In some embodiments, RAN environment 900 may correspond to multiple gNB s 811. In some embodiments, RAN environment 900 may correspond to one or more other types of base stations of one or more other types of RANs. As shown, RAN environment 900 may include Central Unit ("CU") 905, one or more Distributed Units ("DUs") 903-1 through 903-N (referred to individually as "DU 903," or collectively as "DUs 903"), and one or more Radio Units ("RUs") 901-1 through 901-M (referred to individually as "RU 901," or collectively as "RUs 901").

CU 905 may communicate with a core of a wireless network (e.g., may communicate with one or more of the devices or systems described above with respect to FIG. 8, such as AMF 815 and/or UPF 835). In the uplink direction (e.g., for traffic from UEs 801 to a core network), CU 905 may aggregate traffic from DUs 903, and forward the aggregated traffic to the core network. DU 903 may include one or more devices that transmit traffic between a core network (e.g., via CU 905) and UE 801 (e.g., via a respective RU 901). RU 901 may include hardware circuitry (e.g., one or more RF transceivers, antennas, radios, and/or other suitable hardware) to communicate wirelessly (e.g., via an RF interface) with one or more UEs 801, one or more other DUs 903 (e.g., via RUs 901 associated with DUs 903), and/or any other suitable type of device.

One or more elements of RAN environment 900 may, in some embodiments, be communicatively coupled to one or more Multi-Access/Mobile Edge Computing ("MEC") devices, referred to sometimes herein simply as a "MECs," 907. For example, DU 903-1 may be communicatively coupled to MEC 907-1, DU 903-N may be communicatively coupled to MEC 907-N, CU 905 may be communicatively coupled to MEC 907-2, and so on. MECs 907 may include hardware resources (e.g., configurable or provisionable hardware resources) that may be configured to provide services and/or otherwise process traffic to and/or from UE 801, via a respective RU 901.

For example, DU 903-1 may route some traffic, from UE 801, to MEC 907-1 instead of to a core network via CU 905. MEC 907-1 may process the traffic, perform one or more computations based on the received traffic, and may provide traffic to UE 801 via RU 901-1. In some embodiments, MEC 907 may include, and/or may implement, some or all of the functionality described above with respect to UPF 835 and/or one or more other devices, systems, VNFs, CNFs, etc. In this manner, ultra-low latency services may be provided to UE 801, as traffic does not need to traverse DU 903, CU 905, links between DU 903 and CU 905, and an intervening backhaul network between RAN environment 900 and the core network.

Figure 10:
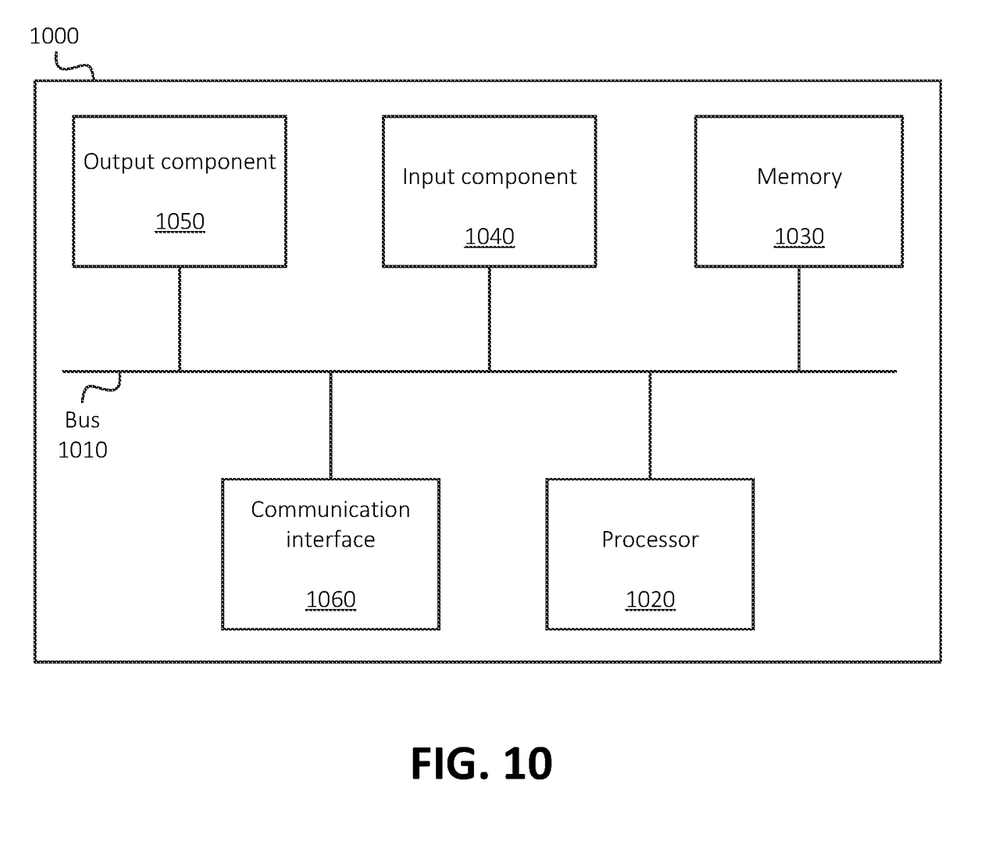
FIG. 10 illustrates example components of one or more devices, in accordance with one or more embodiments described herein.

FIG. 10 illustrates example components of device 1000. One or more of the devices described above may include one or more devices 1000. Device 1000 may include bus 1010, processor 1020, memory 1030, input component 1040, output component 1050, and communication interface 1060. In another implementation, device 1000 may include additional, fewer, different, or differently arranged components.

Bus 1010 may include one or more communication paths that permit communication among the components of device 1000. Processor 1020 may include a processor, microprocessor, or processing logic that may interpret and execute instructions (e.g., processor-executable instructions). In some embodiments, processor 1020 may be or may include one or more hardware processors. Memory 1030 may include any type of dynamic storage device that may store information and instructions for execution by processor 1020, and/or any type of non-volatile storage device that may store information for use by processor 1020.

Input component 1040 may include a mechanism that permits an operator to input information to device 1000 and/or other receives or detects input from a source external to input component 1040, such as a touchpad, a touchscreen, a keyboard, a keypad, a button, a switch, a microphone or other audio input component, etc. In some embodiments, input component 1040 may include, or may be communicatively coupled to, one or more sensors, such as a motion sensor (e.g., which may be or may include a gyroscope, accelerometer, or the like), a location sensor (e.g., a Global Positioning System ("GPS")-based location sensor or some other suitable type of location sensor or location determination component), a thermometer, a barometer, and/or some other type of sensor. Output component 1050 may include a mechanism that outputs information to the operator, such as a display, a speaker, one or more light emitting diodes ("LEDs"), etc.

Communication interface 1060 may include any transceiver-like mechanism that enables device 1000 to communicate with other devices and/or systems. For example, communication interface 1060 may include an Ethernet interface, an optical interface, a coaxial interface, or the like. Communication interface 1060 may include a wireless communication device, such as an infrared ("IR") receiver, a Bluetooth® radio, or the like. The wireless communication device may be coupled to an external device, such as a remote control, a wireless keyboard, a mobile telephone, etc. In some embodiments, device 1000 may include more than one communication interface 1060. For instance, device 1000 may include an optical interface and an Ethernet interface.

Device 1000 may perform certain operations relating to one or more processes described above. Device 1000 may perform these operations in response to processor 1020 executing instructions, such as software instructions, processor-executable instructions, etc. stored in a computer-readable medium, such as memory 1030. A computer-readable medium may be defined as a non-transitory memory device. A memory device may include space within a single physical memory device or spread across multiple physical memory devices. The instructions may be read into memory 1030 from another computer-readable medium or from another device. The instructions stored in memory 1030 may be processor-executable instructions that cause processor 1020 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations.

For example, while series of blocks and/or signals have been described above (e.g., with regard to FIGS. 1-7), the order of the blocks and/or signals may be modified in other implementations. Further, non-dependent blocks and/or signals may be performed in parallel. Additionally, while the figures have been described in the context of particular devices performing particular acts, in practice, one or more other devices may perform some or all of these acts in lieu of, or in addition to, the above-mentioned devices.

The actual software code or specialized control hardware used to implement an embodiment is not limiting of the embodiment. Thus, the operation and behavior of the embodiment has been described without reference to the specific software code, it being understood that software and control hardware may be designed based on the description herein.

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown, in practice, additional, fewer, or different, connections or devices may be used. Furthermore, while various devices and networks are shown separately, in practice, the functionality of multiple devices may be performed by a single device, or the functionality of one device may be performed by multiple devices. Further, multiple ones of the illustrated networks may be included in a single network, or a particular network may include multiple networks. Further, while some devices are shown as communicating with a network, some such devices may be incorporated, in whole or in part, as a part of the network.

To the extent the aforementioned implementations collect, store, or employ personal information of individuals, groups or other entities, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various access control, encryption and anonymization techniques for particularly sensitive information.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A device, comprising:
one or more processors configured to:
maintain one or more models that associate respective objects and triggers with sets of actions, wherein a particular model of the one or more models associates a particular object and one or more triggers with a particular set of actions;
receive visual information from a User Equipment ("UE");
determine that the visual information received from the UE depicts the particular object;
identify, based on information associated with the UE or based on the visual information received from the UE, that the one or more triggers are met; and
provide, to the UE, based on identifying that the visual information received from the UE depicts the particular object, and further based on identifying that the one or more triggers are met, an augmented reality ("AR") virtual assistant that performs the particular set of actions with respect to the particular object.

2. The device of claim 1, wherein the particular set of actions is determined based on a training operation.

3. The device of claim 2, wherein the training operation includes performing image or video recognition on actions performed with respect to the particular object to identify the particular set of actions.

4. The device of claim 1, wherein the information associated with the UE includes audio information captured by the UE.

5. The device of claim 4, wherein identifying, based on the information received from the UE that the one or more triggers are met, includes determining that the audio information includes a speech utterance from a user of the UE that includes one or more words or phrases associated with the one or more triggers.

6. The device of claim 1, wherein the AR virtual assistant is superimposed, in a user interface of the UE, over captured video that depicts the particular object.

7. The device of claim 1, wherein the particular model includes positional relationship information associated with the actions and the particular object, wherein providing the AR virtual assistant includes providing the AR virtual assistant further based on the positional relationship information.

8. A non-transitory computer-readable medium, storing a plurality of processor-executable instructions to:
maintain one or more models that associate respective objects and triggers with sets of actions, wherein a particular model of the one or more models associates a particular object and one or more triggers with a particular set of actions;
receive visual information from a User Equipment ("UE");
determine that the visual information received from the UE depicts the particular object;
identify, based on information associated with the UE or based on the visual information received from the UE, that the one or more triggers are met; and
provide, to the UE, based on identifying that the visual information received from the UE depicts the particular object, and further based on identifying that the one or more triggers are met, an augmented reality ("AR") virtual assistant that performs the particular set of actions with respect to the particular object.

9. The non-transitory computer-readable medium of claim 8, wherein the particular set of actions is determined based on a training operation.

10. The non-transitory computer-readable medium of claim 9, wherein the training operation includes performing image or video recognition on actions performed with respect to the particular object to identify the particular set of actions.

11. The non-transitory computer-readable medium of claim 8, wherein the information associated with the UE includes audio information captured by the UE.

12. The non-transitory computer-readable medium of claim 11, wherein identifying, based on the information received from the UE that the one or more triggers are met, includes determining that the audio information includes a speech utterance from a user of the UE that includes one or more words or phrases associated with the one or more triggers.

13. The non-transitory computer-readable medium of claim 8, wherein the AR virtual assistant is superimposed, in a user interface of the UE, over captured video that depicts the particular object.

14. The non-transitory computer-readable medium of claim 8, wherein the particular model includes positional relationship information associated with the actions and the particular object, wherein providing the AR virtual assistant includes providing the AR virtual assistant further based on the positional relationship information.

15. A method, comprising:
maintaining one or more models that associate respective objects and triggers with sets of actions, wherein a particular model of the one or more models associates a particular object and one or more triggers with a particular set of actions;
receiving visual information from a User Equipment ("UE");
determining that the visual information received from the UE depicts the particular object;
identifying, based on information associated with the UE or based on the visual information received from the UE, that the one or more triggers are met; and
providing, to the UE, based on identifying that the visual information received from the UE depicts the particular object, and further based on identifying that the one or more triggers are met, an augmented reality ("AR") virtual assistant that performs the particular set of actions with respect to the particular object.

16. The method of claim 15, wherein the particular set of actions is determined based on a training operation that includes performing image or video recognition on actions performed with respect to the particular object to identify the particular set of actions.

17. The method of claim 15, wherein the information associated with the UE includes audio information captured by the UE.

18. The method of claim 17, wherein identifying, based on the information received from the UE that the one or more triggers are met, includes determining that the audio information includes a speech utterance from a user of the UE that includes one or more words or phrases associated with the one or more triggers.

19. The method of claim 15, wherein the AR virtual assistant is superimposed, in a user interface of the UE, over captured video that depicts the particular object.

20. The method of claim 15, wherein the particular model includes positional relationship information associated with the actions and the particular object, wherein providing the AR virtual assistant includes providing the AR virtual assistant further based on the positional relationship information.

\* \* \* \* \*